(12) United States Patent
Ju et al.

(10) Patent No.: US 8,990,071 B2
(45) Date of Patent: Mar. 24, 2015

(54) TELEPHONY SERVICE INTERACTION MANAGEMENT

(75) Inventors: Yun-Cheng Ju, Bellevue, WA (US); Stefanie Tomko, Bellevue, WA (US); Frank Liu, Redmond, WA (US); Ivan Tashev, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 338 days.

(21) Appl. No.: 12/749,333

(22) Filed: Mar. 29, 2010

(65) Prior Publication Data

US 2011/0238414 A1 Sep. 29, 2011

(51) Int. Cl.
*G10L 19/00* (2013.01)
*H04M 1/725* (2006.01)
*H04M 1/50* (2006.01)
*H04M 3/493* (2006.01)

(52) U.S. Cl.
CPC .......... *H04M 1/72519* (2013.01); *H04M 1/505* (2013.01); *H04M 3/493* (2013.01); *H04M 2201/40* (2013.01); *H04M 2250/74* (2013.01)
USPC ........... 704/201; 704/231; 704/246; 704/247; 704/251; 704/252

(58) Field of Classification Search
None
See application file for complete search history.

(56) References Cited

U.S. PATENT DOCUMENTS

| | | | |
|---|---|---|---|
| 6,594,347 B1 * | 7/2003 | Calder et al. | 379/88.01 |
| 6,604,075 B1 | 8/2003 | Brown et al. | |
| 6,778,653 B1 * | 8/2004 | Kallas et al. | 379/201.02 |
| 7,292,680 B1 | 11/2007 | Simpson | |
| 7,920,546 B2 * | 4/2011 | Sylvain | 370/352 |
| 8,140,980 B2 * | 3/2012 | Gunasekar et al. | 715/753 |
| 8,204,180 B1 * | 6/2012 | Narayanan et al. | 379/88.04 |
| 8,532,267 B1 * | 9/2013 | Gupta et al. | 379/88.01 |
| 2002/0090066 A1 * | 7/2002 | Gupta et al. | 379/88.03 |
| 2002/0122541 A1 * | 9/2002 | Metcalf | 379/88.02 |
| 2003/0074198 A1 * | 4/2003 | Sussman | 704/270.1 |
| 2004/0086095 A1 | 5/2004 | Dixit et al. | |
| 2004/0230637 A1 | 11/2004 | Lecoueche et al. | |
| 2005/0129208 A1 * | 6/2005 | McGrath et al. | 379/218.01 |
| 2005/0147219 A1 | 7/2005 | Comerford | |
| 2005/0154621 A1 * | 7/2005 | Birkhead et al. | 705/5 |
| 2005/0239487 A1 | 10/2005 | Glass et al. | |
| 2005/0265524 A1 | 12/2005 | Vollkommer et al. | |

(Continued)

FOREIGN PATENT DOCUMENTS

| | | |
|---|---|---|
| CN | 1377550 A | 10/2002 |
| CN | 1379947 A | 11/2002 |
| CN | 1780318 A | 5/2006 |

OTHER PUBLICATIONS

"VUI and IVR Solutions Voice User Interface Technology", Retrieved at <<http://www.easyivr.com/vui.htm>>, Jan. 13, 2010, pp. 5.

Parsons, Steve,"Automatic Speech Recognition Fine-Tunes Self-Service", Retrieved at <<http://www.thefreelibrary.com/Automatic+Speech+Recognition+Fine-Tunes+Self-Service.-a079664687>>, Oct. 1, 2001, pp. 9.

(Continued)

*Primary Examiner* — Leonard Saint Cyr
(74) *Attorney, Agent, or Firm* — Bryan Webster; Kate Drakos; Micky Minhas (57) ABSTRACT

A method for managing an interaction of a calling party to a communication partner is provided. The method includes automatically determining if the communication partner expects DTMF input. The method also includes translating speech input to one or more DTMF tones and communicating the one or more DTMF tones to the communication partner, if the communication partner expects DTMF input.

20 Claims, 5 Drawing Sheets

(56) References Cited

U.S. PATENT DOCUMENTS

| | | |
|---|---|---|
| 2007/0189479 A1* | 8/2007 | Scherer .................... 379/142.01 |
| 2008/0015846 A1 | 1/2008 | Acero et al. |
| 2009/0147937 A1* | 6/2009 | Sullhan et al. ........... 379/201.02 |
| 2009/0170058 A1* | 7/2009 | Walker et al. ................. 434/323 |
| 2010/0238842 A1* | 9/2010 | Narayanan et al. ........... 370/261 |
| 2010/0274563 A1* | 10/2010 | Malo et al. ................. 704/270.1 |

OTHER PUBLICATIONS

Essex, David, "Easy IVR Tech Library", Retrieved at <<http://www.easyivr.com/tech-ivr-applications_95.htm>>, 2010, pp. 5.

State Intellectual Property Office of China, Office Action for Chinese Patent Application No. 201110084918.5, Jan. 30, 2014, 12 pages.

* cited by examiner

TELEPHONY SERVICE INTERACTION MANAGEMENT

BACKGROUND

Telephony services such as voice mail applications, call centers, and telephone marketing services, may be automated. For example, some automated telephony services support speech recognition wherein a calling party interacts with the automated service using voice commands. Some automated telephony services support dual tone multi-frequency (DTMF) input wherein a calling party interacts with the automated service by pressing keys on a keypad to send DTMF tones to the automated service. In some examples, automated telephony services may not be capable of recognizing speech in a voice input issued by a calling party, and instead rely on a caller sending tones to the service by pressing keys on a telephone keypad. A calling party uses her hands and eyes to press the buttons and navigate through the automated service. This type of interaction with the telephone keypad may create obstacles for vehicle operators and/or other callers using their hands and/or eyes for other tasks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In one example embodiment, a method for managing an interaction of a calling party to a communication partner is provided. The method includes automatically determining if the communication partner expects DTMF input. The method also includes translating speech input to one or more DTMF tones and communicating the one or more DTMF tones to the communication partner.

DETAILED DESCRIPTION

The present disclosure is directed to systems and methods for managing an interaction between a calling party and a called party (communication partner) over a telecommunications network, such as a telephone network. In some examples, the called party may provide an automated telephony service. Automated telephony services may support speech recognition (SR) which allows the calling party to interact with the automated service using speech input. For example, speech input may be provided by the calling party to navigate through an automated menu or to send information to the automated telephony service.

However, some automated telephony services may not support speech recognition and may expect dual tone multi-frequency (DTMF) input. The calling party generally uses hands and eyes to navigate through and interact with automated telephony services expecting DTMF input. For example, a calling party may use his hands and eyes in order to press the buttons and navigate through the automated service, send data to the automated service, or reach a live agent. This type of interaction with the telephone keypad may create obstacles for vehicle operators and/or other callers using their hands and/or eyes for other tasks.

Figure 1:
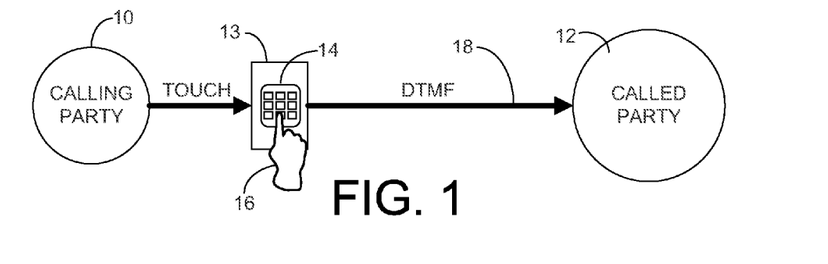
FIG. 1 schematically shows an example interaction of a calling party with a called party expecting DTMF input.

FIG. 1 illustrates an example interaction of a calling party 10 with an automated called party 12. In this example, the calling party may initiate a call to the calling party using a telephony device 13, e.g., a cell phone. The calling party may interact with the called party by pressing one or more keys on a keypad 14 using a physical input 16, e.g., hands or fingers, in response to one or more audio prompts provided by the called party. By inputting touch input into the telephony device, e.g., pressing one or more keys on the keypad, the calling party may send a stream of DTMF tones 18 to the called party.

Automated telephony services provide automated menus that a calling party may navigate through, for example to connect to a live agent. In a scenario where the called party expects DTMF input, the calling party may navigate through the automated menu by inputting touch input into the telephony device, e.g.; pressing one or more buttons on a keypad, or similar interface provided by the telephony device, in order to send the DTMF tones to the called party to navigate through the menu.

For example, a vehicle operator may initiate a call to an automated called party using an in-vehicle infotainment system or cell phone, e.g., to check voice mail, bank account information, stocks, etc. When the called party expects DTMF input, the vehicle operator may look at an interface included on the infotainment system or cell phone, e.g., a keypad, to press the correct numbers so that the infotainment system or cell phone can send corresponding DTMF tones to the called party.

The example interactions described above with reference to FIG. 1 may create obstacles in situations where the calling party's attention is or should be focused on other tasks. For example, if the calling party is operating a vehicle, the calling party's hands and eyes may be focused on operating the vehicle. In such a scenario, interacting with a calling party may be dangerous. Additionally, laws may be passed which prohibit a vehicle operator from physically interacting with such a system while operating a vehicle.

In addition to safety concerns, an interaction with a calling party via a telecommunications network, such as illustrated in FIG. 1, may inconvenience a calling party whose attention is focused on other tasks. For example, a calling party may desire to navigate an automated menu while performing another task, such as driving a vehicle. In such scenarios, listening for audio prompts provided by the called party and/or pressing keys on a keypad in response to such prompts, e.g., to navigate an automated menu to speak to a live agent, may result in caller annoyance and discomfort.

In order to address the issues described above, a call manager including a speech to DTMF translator may be provided to intercept and manage an interaction of a calling party to a communication partner over a telecommunications network. For example, a speech to DTMF translator may translate voice commands into corresponding DTMF tones to send to the called party on the calling party's behalf.

The call manager may manage an interaction of a calling party to a called party through a variety of different configurations. In some embodiments a call manager may be implemented on the client side such as a component of a telephony device, e.g., a cell phone, or as a component of an onboard vehicle infotainment system, or similar device cooperating with the phone.

Figure 2A:
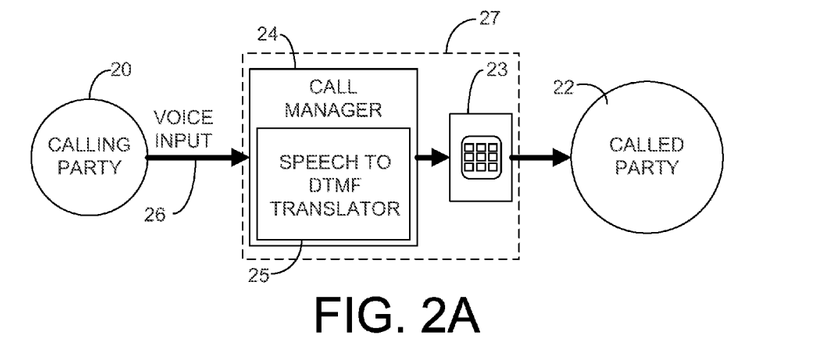
FIG. 2A schematically shows another example interaction of a calling party with a called party expecting DTMF input.

For example, FIG. 2A illustrates an example interaction of a calling party 20 with called party 22 managed with a call manager 24 including a speech to DTMF translator 25 implemented on the client side. As indicated at 27, the call manager may be a component of a telephony device 23, e.g., a cell phone. In other examples, the call manager may be a component of an onboard vehicle infotainment system, or similar device, configured to cooperate with telephony device 23. For example, call manager 24 may include a voice user interface (VUI) application, e.g., a voice mail retrieval application, which may be executed by telephony device 23, an onboard vehicle infotainment system, and/or another suitable device.

In some examples, the calling party 20 may initiate a call to the called party 22 with a voice input 26 provided to call manager 24. The voice input may include key words or phrases recognized by a speech recognition (SR) system included in the call manager, for example. The call manager may send DTMF tones, synthesized voice responses, and the like to the called party 22 on behalf of the calling party in order to manage the interaction.

For example, the speech to DTMF translator 25 of the call manager may recognize speech patterns in a voice stream using an SR engine and translate recognized speech patterns into a plurality of DTMF tones. The speech to DTMF translator may include a map of speech patterns to associated DTMF tones, e.g., stored on a data-holding subsystem of the speech to DTMF translator. Such a map may include pre-set key words or key phrases associated with corresponding DTMF tones.

The call manager may be configured to acknowledge macro voice commands defined by a user of the telephony device. Macro voice commands may include key words or phrases assigned to a plurality of DTMF tones by a user of the telephony device. For example, a user of the telephony device may associate the speech pattern "my PIN" with a sequence of DTMF tones corresponding to a multi-digit PIN number.

For example, the calling party may say "Press 3" which is translated to DTMF tone 3 by the speech to DTMF translator and output to the called party. As another example, the calling party may say "my PIN" which is translated to a plurality of DTMF tones and output to the called party. In this way, the calling party may interact with an automated service using one or more voice commands, thus freeing up the hands, eyes, and attention of the calling party and reducing speech recognition errors.

Figure 2B:
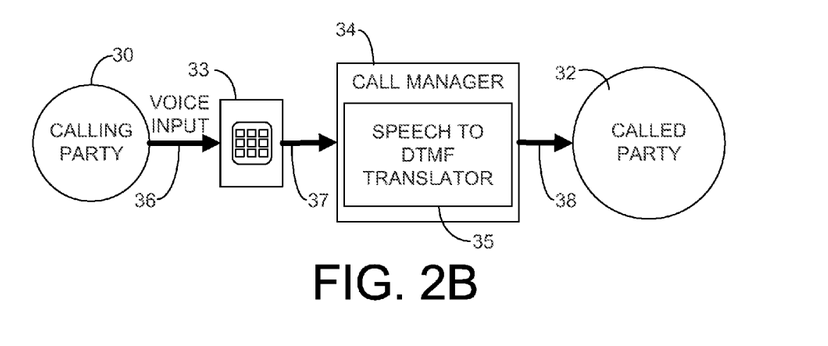
FIG. 2B schematically shows another example interaction of a calling party with a called party expecting DTMF input.

In some embodiments, a call manager may be implemented server-side, for example as a node in a telecommunications network. In such embodiments, a calling party may use a telephony device, e.g., a cell phone, to contact the call manager. The call manager may then initiate a call to the calling party and manage the interaction on behalf of the calling party. For example, FIG. 2B illustrates an example interaction of a calling party 30 with called party 32 managed with a call manager 34 including a speech to DTMF translator 35 located server-side on a telecommunications network (e.g., a remote DTMF translation service). For example, the telecommunications network may include a plurality of distinct nodes, where the plurality of distinct nodes includes the calling party, the call manager, and the called party.

In this example, a calling party 30 initiates a call to a call manager 34. Call manager 34 may then initiate a call to the called party 32 and manage the interaction on behalf of the calling party. For example, the calling party may input voice commands into the telephony device 33 via voice input 36. The telephony device 33 may send the voice input 36 via a voice stream 37 over a telecommunications network to the call manager 34. The speech to DTMF translator 35 in the call manager may recognize speech patterns in the voice stream using an SR engine, and translate recognized speech patterns into corresponding DTMF tones to send to the called party.

In some examples, a call manager may assist a calling party in navigating through an automated menu, e.g., to speak to a live agent. For example, in response to a voice command by a calling party, the call manager may mute the audio signal provided to the calling party by the called party while monitoring the audio signals provided by the called party to identify prompts for input. In response to identified prompts, the call manager may automatically, without further input from the calling party, send appropriate synthesized responses or DTMF tones to automatically proceed through a menu to reach a live agent, or achieve another desired result. Additionally, the call manager may notify the calling party when a live agent has been reached, or another desired result has been achieved. In this way, a caller may reach a live agent through an automated menu without constantly monitoring the phone call, manually pressing buttons, or even continuously giving voice commands.

Figure 3:
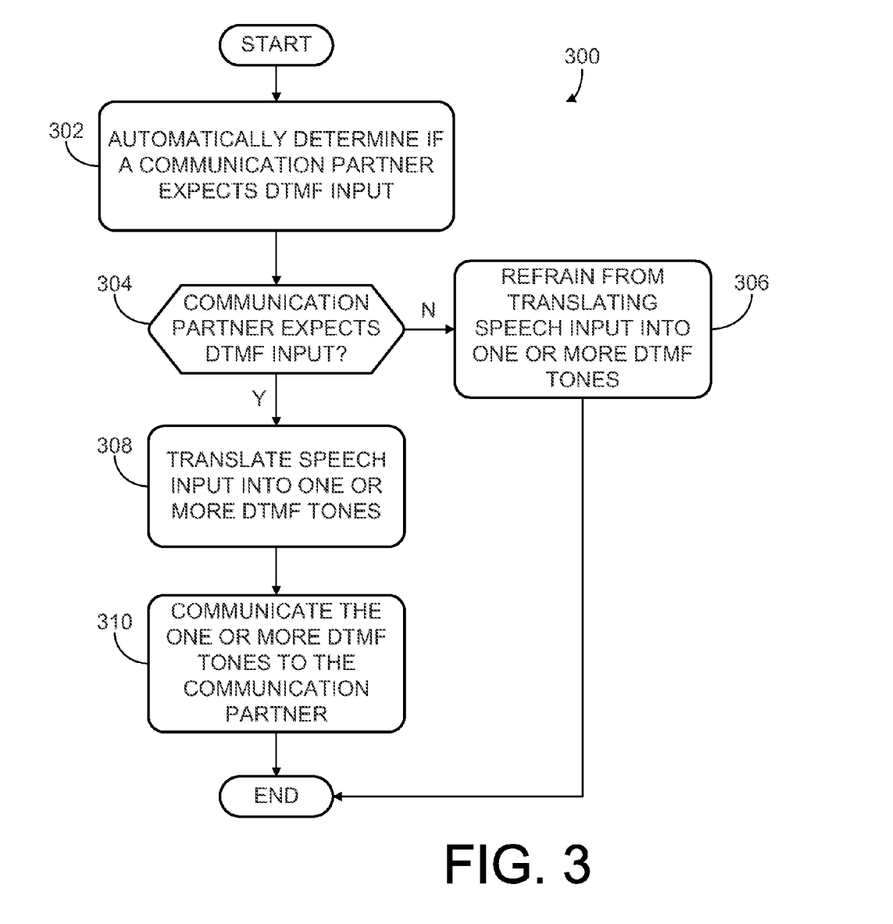
FIG. 3 shows an example method for managing an interaction of a calling party to a communication partner over a telecommunication network.
Figure 4:
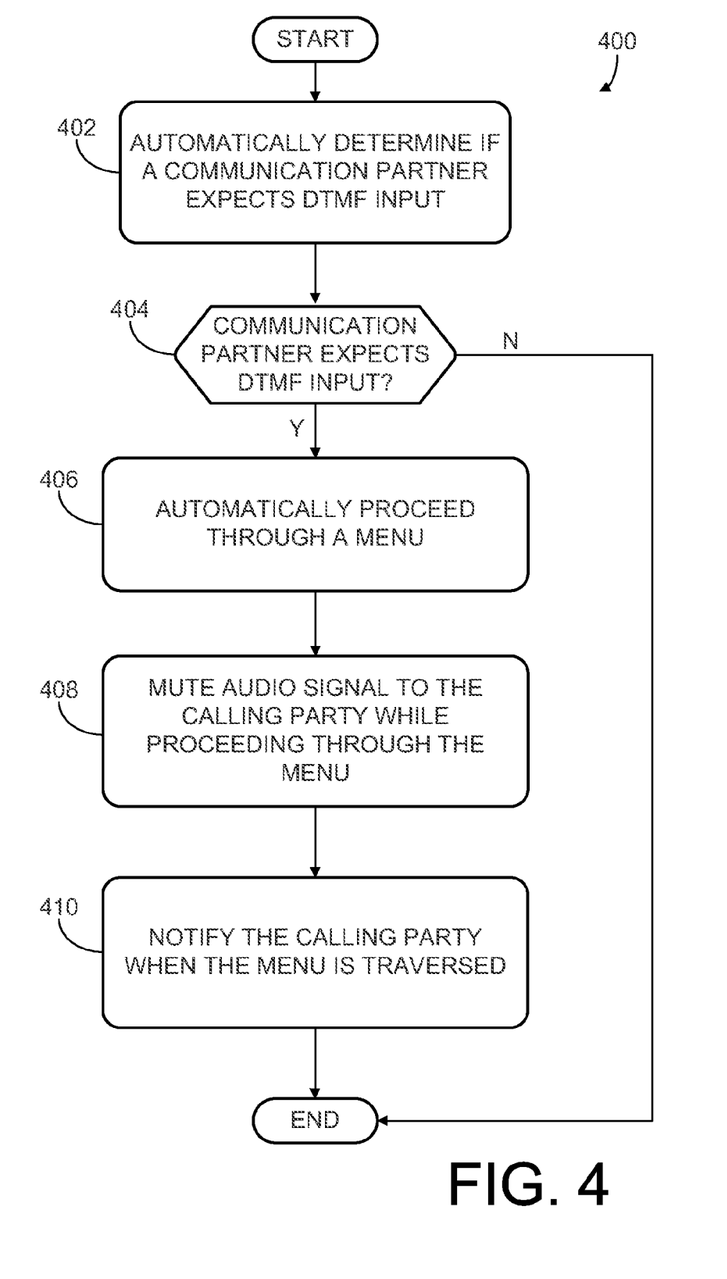
FIG. 4 shows another example method for managing an interaction of a calling party to a communication partner over a telecommunication network.
Figure 5:
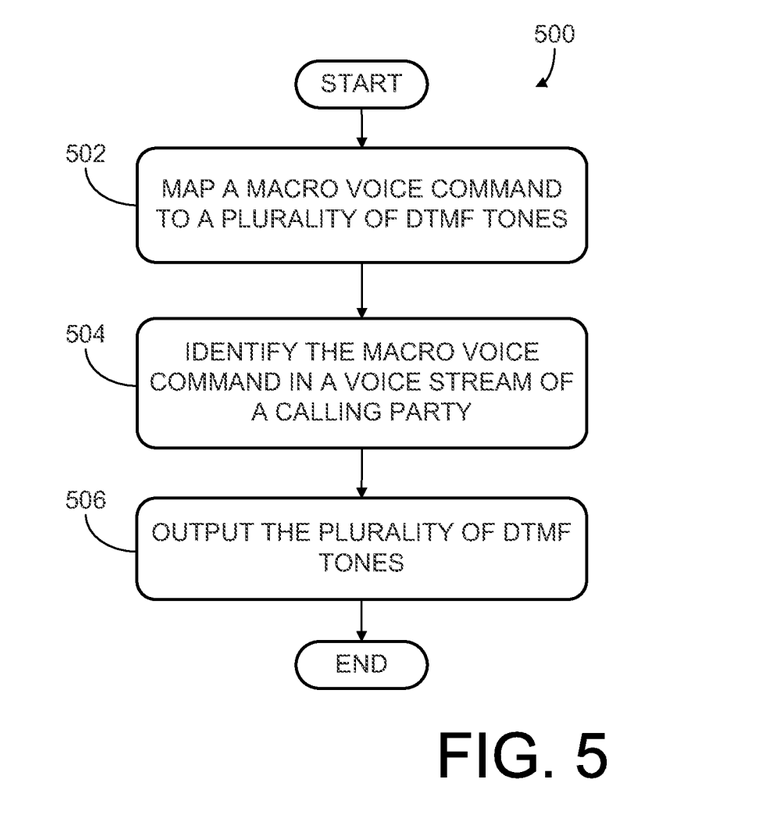
FIG. 5 shows an example method for managing an interaction over a telecommunication network using macro voice commands.

FIGS. 3-5 show various example methods for managing an interaction of a calling party to a called party over a telecommunications network.

At 302 of FIG. 3, a method 300 includes automatically determining if the communication partner expects DTMF input. Automatically determining if the communication partner expects DTMF input may include determining if the communication partner is an automated service and, if so, determining if the automated service expects DTMF input. Automatically determining if the communication partner expects DTMF input may also include determining if the communication partner is a live agent.

In some examples, automatically determining if a communication partner expects DTMF input may be based on a speech input of the calling party. For example, a delay in speech provided by the calling party may indicate that the calling party is set to enter data to send to the called party. In other examples, the calling party may use one or more voice commands or a user interface to indicate that the communication partner expects DTMF input.

In other examples, automatically determining if a communication partner expects DTMF input or is a live agent may include using a speech recognition system to monitor audible prompts from the communication partner to recognize one or more key phrases. For example, an SR engine may be used to monitor audible signals from the communication partner. Recognized speech may be sent to a speech classifier to determine if the communication partner expects DTMF input. The speech classifier may provide a statistical analysis of the content of the phrases identified by the SR engine, for example. For example, phrases such as "Press # when you are finished" may be used to identify whether the communication partner expects DTMF input. In some examples, the SR engine may be a subsystem of a speech to DTMF translator which may be included within an infotainment system onboard a vehicle or in a cell phone. In other examples, the SR engine may be a subsystem of a speech to DTMF translator node in a telecommunications network.

In some examples, automatically determining if a communication partner is a live agent may be based on a change of an audio level in audible signals from the communication partner. For example, the audio level of an automated service may be different than the audio level of a live agent. As another example, the audio level may decrease when a communication partner is expecting DTMF input.

In still further examples, automatically determining if a communication partner is a live agent may include sending one or more queries to the communication partner. For example, an artificial query such as "Hello?" may be synthesized and sent to the communication partner and the response monitored to identify whether or not a live agent is present. In some examples, monitoring a response to an artificial query may include identifying a change in an audio level in audible signals from the communication partner. For example, volume and/or noise level may increase when a live agent comes on the line. In other examples, monitoring a response to an artificial query may include sending the audio signal provided by the communication partner to an SR engine to determine whether the communication partner provides one or more appropriate responses to the artificial query. For example, an artificial query such as "Are you there?" may have an appropriate response of "Yes."

Additionally, automatically determining if a communication partner expects DTMF input may be based on the phone number and/or time of day at the location of the called party. For example, certain numbers may be known to provide automated services during certain hours of the day. A database of called party numbers may be stored in a data-holding subsystem of the call manager together with information about whether or not the called party expects DTMF input. Such a database may be pre-set or be created on a call-by-call basis. For example, if a calling party calls a called party which is identified as expecting DTMF input, then the telephone number of the called party may be stored in a database for future calls. Such a database may be a user-specific database that is maintained for a particular calling party or a shared database that is used by a plurality of different calling parties. In other examples, a user may specify which numbers are automated in an address book stored on a data-holding subsystem of the call manager or on the telephony device used to make calls.

If at 304, the communications partner does not expect DTMF input, method 300 proceeds to 306. At 306, method 300 includes refraining from translating speech input into one or more DTMF tones. Refraining from translating speech input into one or more DTMF tones may include refraining from translating pre-set voice commands, e.g., macro voice commands, to DTMF tones; for example, when a live communication partner answers the phone or when a called party accepts voice input.

However, if at 304, the communications partner expects DTMF input, then method 300 proceeds to 308. At 308, method 300 includes translating speech input into one or more DTMF tones. As described above, translating speech input into one or more DTMF tones may include monitoring a voice stream from the calling party with an SR engine, recognizing key words or phrases in the voice stream and translating the recognized key words or phrases into corresponding DTMF tones by consulting a map, such as a map stored in a data-holding subsystem of a speech to DTMF translator.

At 310, method 300 includes communicating the one or more DTMF tones to the communication partner. For example, a speech to DTMF translator may send the tones on behalf of the calling party to the called party over the telecommunications network.

FIG. 4 shows another example method 400 for managing an interaction of a calling party to a communication partner over a telecommunication network.

At 402, method 400 includes automatically determining if a communication partner expects DTMF input. As described above with reference to FIG. 3, automatically determining if a communication partner expects DTMF input may be based on information transmitted over the telecommunication network, including a speech input of the calling party, recognition of key words or phrases in an audio stream, a change of an audio level in an audio stream, responses to queries sent to the called party, etc.

If at 404, the communication partner does not expect DTMF input, method 400 ends. Otherwise, if at 404, the communications partner expects DTMF input, method 400 proceeds to 406.

At 406, method 400 includes automatically proceeding through a menu. In some examples, automatically proceeding through a menu may include automatically proceeding through a menu to reach a live agent. Automatically proceeding through a menu to reach a live agent may include using an SR engine to recognize key words or phrases spoken by the called party. When key words and phrases are identified, appropriate responses may be provided by the call manager to the called party to reach a live agent. Responses to the called party to reach a live agent may include DTMF tones, e.g., DTMF tone 0 to speak to a live agent, synthesized voice responses, and the like.

In other examples, automatically proceeding through a menu to reach a live agent may include sending queries to the called party and monitoring the audio signal from the called party to identify when a live agent has been reached. As described above, monitoring a response to an artificial query may include identifying a change in an audio level in audible signals from the communication partner or sending the audio signal provided by the communication partner to an SR engine to determine whether the communication partner provides one or more appropriate responses to the artificial query.

In still other examples, automatically proceeding through a menu may include automatically navigating through a menu to reach a destination on behalf of the calling party. For example, a calling party may wish to retrieve or provide information, e.g., checking account information, by calling an automated service, e.g., an automated service provided by a bank. In this example, an automated menu provided by the communication partner may be automatically traversed to retrieve or provide the information.

Automatically navigating through a menu to reach a destination on behalf of the calling party may include using an SR engine to recognize key words or phrases spoken by the called party. When key words and phrases are identified, appropriate responses may be provided by the call manager to the called party to navigate the menu to reach the destination. Responses to the called party to navigate the menu to reach a destination may include DTMF tones, synthesized voice responses, and the like.

At 408, method 400 includes muting an audio signal provided by the called party to the calling party while proceeding through the menu. For example, a call manager may continue to monitor and respond to prompts provided by the called party while muting the audio signal provided to the calling party. In this way, distraction to a calling party may be reduced while an automated menus is traversed, e.g., until a live agent is reached.

At 410, method 400 includes notifying the calling party when the automated menu is traversed, e.g., when a live agent or destination is reached. For example, notifying the calling party when an automated menu is traversed may include un-muting the audio signal provided by the called party to the calling party and/or providing a notification sound, e.g., a ring, beep, and/or synthesized voice alert, to the calling party to alert the calling party that a live agent has been reached.

In some examples, automatically navigating through a menu to reach a destination may be performed in response to one or more voice commands provided by the calling party. For example, a calling party may provide the voice command "checking account information." The call manager may recognize the voice command, e.g., by using an SR engine. In response to recognizing the voice command, the call manager may mute the audio provided to the calling party and initiate a call to the called party, e.g., a bank. The call manager may then recognize menu prompts provided by the called party and provide appropriate responses to the recognized menu prompts. For example, the call manager may provide DTMF tones, synthesized voice responses, and the like to the called party in order to navigate the automated menu to reach a menu destination. When the menu destination is reached, the call manager may un-mute the audio provided to the calling party, e.g., to provide the checking account information to the calling party.

In some examples, automatically navigating through a menu to reach a destination may be based on training data obtained from previous calls to an automated service. For example, when a calling party provides a voice command, e.g., "checking account information," to the call manager, the call manager may navigate the automated service based on a previous call, e.g., a previous call to obtain banking account information. For example, the automated service providing checking account information may include a menu which includes prompts such as "English or Spanish," "Enter PIN number," and "Account Information." The call manager may employ an SR engine to recognize a set of keywords based on a training set from a previous call to the automated service.

In some examples, a fuzzy search algorithm may be employed by the call manager to determine which menu options to choose while traversing a menu to reach a menu destination. At each identified menu prompt the call manager may output one or more DTMF tones to traverse the menu. In some examples, the call manager may explore an entire automated menu to find a desired menu option. In this example, if a desired menu option is not found in the automated menu, the call manager may traverse the menu to reach a live agent and notify the calling party. Once a live agent is reached the call manager may un-mute the audio provided to the calling party and notify the calling party that a live agent has been reached.

FIG. 5 shows an example embodiment of a method 500 for managing an interaction over a telecommunication network using macro voice commands.

At 502, method 500 includes mapping a macro voice command to a plurality of DTMF tones. As described above, macro voice commands may include key words or phrases assigned to a plurality of DTMF tones by a user of the telephony device used by the calling party, e.g., as a map stored on a data-holding subsystem of a telephony server. In this way the macro voice commands may be encoded for security and may reduce recognition errors by an SR engine.

In some examples, mapping a macro voice command to a plurality of DTMF tones may occur in response to a prompt by a user. For example, the prompt by a user may include an interaction of the user with a user interface provided by or in communication with the call manager. The user interface may accept voice and/or touch input, e.g., the user interface may be a VUI or a graphical user interface (GUI). In some examples, a user may map a macro voice command to a plurality of DTMF tones by inputting, via speech or touch, an original key word or phrase together with a corresponding DTMF tone sequence. In other examples, a user may choose a key word or phrase from a preset list presented by the interface, then input, via speech or touch, a corresponding DTMF sequence. It should be understood that any number of tones may be assigned to a macro voice command. Additionally, macro voice commands may include pauses of set durations or other audio information which may be recognized by an SR engine.

At 504, method 500 includes identifying the macro voice command in a voice stream of a calling party. Identifying the macro voice command in a voice stream of a calling party may include using an SR engine to monitor the voice stream of the calling party and recognizing macro voice commands in the voice stream.

At 506, method 500 includes outputting the plurality of DTMF tones. For example, the plurality of DTMF tones may be output over a telecommunication network by a speech to DTMF translator in the call manager to the called party. Outputting the plurality of DTMF tones at 506 may also include navigating an automated menu to reach a menu destination as described above. For example, in addition to DTMF tones, synthesized voice responses, silence, and/or artificial queries may be output by the call manager to navigate an automated menu to reach a destination.

Figure 6:
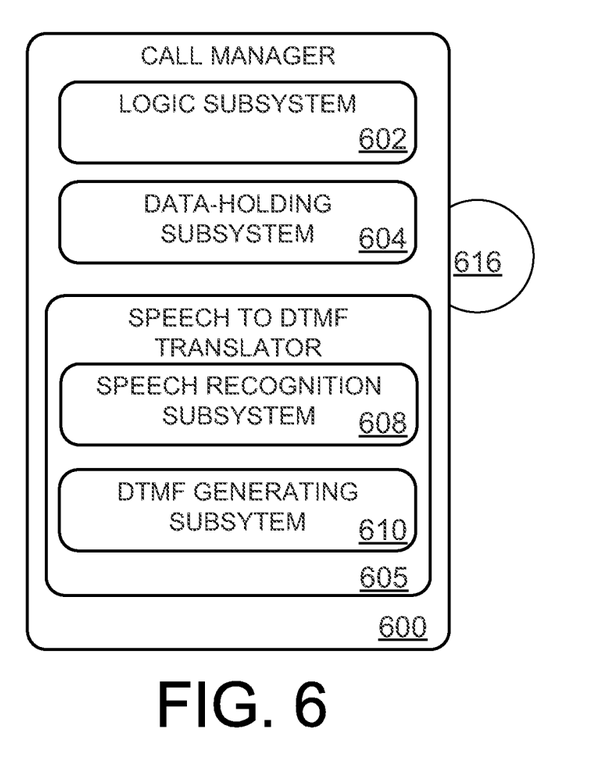
FIG. 6 schematically shows an example embodiment of a call manager including a data-holding subsystem configured to manage interactions over a telecommunications network.

In some embodiments, the above described methods and processes may be tied to a computing system. As an example, FIG. 6 schematically shows a call manager 600 that may perform one or more of the above described methods and processes. Call manager 600 includes a logic subsystem 602 and a data-holding subsystem 604. Call manager 600 may optionally include a display subsystem and/or other components not shown in FIG. 6.

As described above, call manager 600 may manage an interaction of a calling party to a called party through a variety of different configurations. For example, the call manager translator may be included within an infotainment system onboard a vehicle or in a cell phone, e.g. as a voice user interface (VUI) application. In other examples, the call manager may be a node in a telecommunications network, e.g., operated as a remote service of which a variety of different types of communication devices may take advantage.

Logic subsystem 602 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 604 may include one or more physical, non-transitory, devices configured to hold data and/ or instructions executable by the logic subsystem to implement the herein described methods and processes. When such methods and processes are implemented, the state of data-holding subsystem 604 may be transformed (e.g., to hold different data). Data-holding subsystem 604 may include removable media and/or built-in devices. Data-holding subsystem 604 may include optical memory devices, semiconductor memory devices, and/or magnetic memory devices, among others. Data-holding subsystem 604 may include devices with one or more of the following characteristics: volatile, nonvolatile, dynamic, static, read/write, read-only, random access, sequential access, location addressable, file addressable, and content addressable. In some embodiments, logic subsystem 602 and data-holding subsystem 604 may be integrated into one or more common devices, such as an application specific integrated circuit or a system on a chip.

FIG. 6 also shows an aspect of the data-holding subsystem in the form of computer-readable removable media 616, which may be used to store and/or transfer data and/or instructions executable to implement the herein described methods and processes.

The terms "module" and "engine" may be used to describe an aspect of call manager 600 that is implemented to perform one or more particular functions. In some cases, such a module or engine may be instantiated via logic subsystem 602 executing instructions held by data-holding subsystem 604. It is to be understood that different modules and/or engines may be instantiated from the same application, code block, object, routine, and/or function. Likewise, the same module and/or engine may be instantiated by different applications, code blocks, objects, routines, and/or functions in some cases.

Call manager 600 includes a speech to DTMF translator 605. Speech to DTMF translator includes a speech recognition subsystem 608 configured to monitor an audio stream and recognize speech patterns in the audio stream. Speech recognition subsystem 608 may include a variety of modules configured to identify speech and classify the identified speech. For example, speech recognition subsystem 608 may include a speech classifier module which provides a statistical analysis of recognized speech patterns. Speech recognition subsystem 608 may further parse the recognized speech patterns to identify key words or phrases which have been assigned to DTMF tones in a map stored in the data-holding subsystem 604. For example, macro voice commands may be assigned by a user via a user interface and stored in a map on the data-holding subsystem. DTMF tones may be generated by a DTMF generating device 610, which may send the DTMF tones to a called party.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for managing an interaction of a calling party to a communication partner over a telecommunications network, comprising:
analyzing an audio signal of the interaction of a calling party to a communication partner, the interaction being initiated by the calling party and directed to the communication partner;
automatically determining if the communication partner expects DTMF input based on the audio signal;
if the communication partner expects DTMF input,
monitoring audio signals provided by the communication partner to identify prompts for input and, for each identified prompt for input, communicating one or more DTMF tones to the communication partner responsive to that identified prompt for input, the one or more DTMF tones being selected for each identified prompt for input to automatically proceed through an automated menu provided by the communication partner without further input from the calling party to reach a live agent of the communication partner.

2. The method of claim 1, wherein automatically determining if the communication partner expects DTMF input is based on a speech input of the calling party.

3. The method of claim 1, wherein automatically determining if the communication partner expects DTMF input includes using a speech recognition system to monitor audible signals from the communication partner to recognize one or more key phrases.

4. The method of claim 1, wherein automatically determining if the communication partner expects DTMF input is based on a change of an audio level in audible signals from the communication partner.

5. The method of claim 1, wherein automatically determining if the communication partner expects DTMF input includes sending a query to the communication partner.

6. The method of claim 1, further comprising, if the communication partner does not expect DTMF input, refraining from translating speech input to one or more DTMF tones.

7. The method of claim 1, further comprising muting an audio signal provided to the calling party by the communication partner while automatically proceeding through the automated menu to reach the live agent.

8. The method of claim 1, further comprising notifying the calling party when the live agent is reached.

9. The method of claim 1, further comprising initiating a call from the calling party to the communication party responsive to a voice command from the calling party, wherein the one or more DTMF tones are communicated to the communication partner responsive to menu prompts of the automated menu to traverse the automated menu based on the voice command and without further input from the calling party to automatically reach the live agent.

10. A call manager to manage an interaction of a calling party to a communication partner over a telecommunications network, comprising:
a logic subsystem, which includes one or more processors that are configured to execute software instructions; and
a data-holding subsystem, which includes one or more memory devices, holding instructions executable to
receive a voice stream directed from a remote calling party to a remote called party via a telecommunications network;
recognize speech input from the voice stream;
translate a recognized speech input into one or more DTMF tones;
send the one or more DTMF tones via the telecommunications network to the remote called party;
monitor audio signals provided by the remote called party to identify prompts for input; and for each identified prompt for input, communicate one or more selected DTMF tones to the remote called party responsive to that identified prompt for input, the one or more selected DTMF tones being selected for each identified prompt for input to automatically proceed through an automated menu provided by the remote called party without further input from the remote calling party to reach a live agent of the remote called party.

11. The call manager of claim 10, wherein the telecommunications network includes a plurality of distinct nodes and the plurality of distinct nodes includes the calling party, the call manager, and the called party.

12. The call manager of claim 10, wherein the data-holding subsystem holds instructions executable to determine if the called party expects DTMF input.

13. The call manager of claim 12, wherein the data-holding subsystem holds instructions executable to refrain from translating speech input to one or more DTMF tones if the called party does not expect DTMF input.

14. The call manager of claim 12, wherein the data-holding subsystem holds instructions executable to automatically proceed through a menu to reach a live agent if the called party expects DTMF input.

15. The call manager of claim 14, wherein the data-holding subsystem holds instructions executable to mute an audio signal to the calling party while proceeding through a menu to reach a live agent.

16. The call manager of claim 14, wherein the data-holding subsystem holds instructions executable to notify the calling party when a live agent is reached.

17. The call manager of claim 10, wherein the called party is a voice-mail retrieval application.

18. A method for managing an interaction of a remote calling party to a remote communication partner over a telecommunications network, comprising:
  receiving, at an intermediate call manager via a telecommunications network, an audio signal of the interaction of the remote calling party to the remote communication partner, wherein the remote calling party and the remote communication partner and the intermediate call manager are at different network nodes;
  analyzing, at the intermediate call manager, an audio signal of the interaction of the remote calling party to the remote communication partner;
  automatically determining, at the intermediate call manager, if the remote communication partner expects DTMF input based on the audio signal;
  if the remote communication partner expects DTMF input, identifying, at the intermediate call manager, a macro voice command in a voice stream of the calling party;
  mapping, at the intermediate call manager, the macro voice command to a plurality of DTMF tones;
  outputting, from the intermediate call manager to the remote communications partner, the plurality of DTMF tones;
  monitoring audio signals provided by the remote called party to identify prompts for input; and
  for each identified prompt for input, communicating one or more selected DTMF tones to the remote called party responsive to that identified prompt for input, the one or more selected DTMF tones being selected for each identified prompt for input based on recognized key words or phrases in the monitored audio signals to automatically proceed through an automated menu provided by the remote called party without further input from the remote calling party to reach a live agent of the remote called party.

19. The method of claim 18, wherein mapping a macro voice command to a plurality of DTMF tones occurs in response to a prompt by a user.

20. The method of claim 19, wherein the prompt by the user includes an interaction of the user with a user interface.

* * * * *